Sept. 15, 1959 R. G. LEGROS 2,903,894

METHOD AND APPARATUS FOR THE TRANSMISSION AND RECEPTION OF RADIO SIGNALS ON A LARGE NUMBER OF REGULARLY SPACED FREQUENCIES

Filed Jan. 19, 1955 4 Sheets-Sheet 1

INVENTOR

ROBERT G. LEGROS

By Holcombe, Wetherill & Brisebois

ATTORNEYS

Sept. 15, 1959 R. G. LEGROS 2,903,894

METHOD AND APPARATUS FOR THE TRANSMISSION AND RECEPTION OF RADIO SIGNALS ON A LARGE NUMBER OF REGULARLY SPACED FREQUENCIES

Filed Jan. 19, 1955 4 Sheets-Sheet 2

INVENTOR

ROBERT G. LEGROS

By Holcombe, Wetherill & Brisebois

ATTORNEYS

INVENTOR
ROBERT G. LEGROS
By Holcombe, Wetherill & Brisebois
ATTORNEYS

INVENTOR
ROBERT G. LEGROS
By
Holcombe Wetherill & Brisebois
ATTORNEYS

United States Patent Office 2,903,894

Patented Sept. 15, 1959

2,903,894

METHOD AND APPARATUS FOR THE TRANSMISSION AND RECEPTION OF RADIO SIGNALS ON A LARGE NUMBER OF REGULARLY SPACED FREQUENCIES

Robert Guy Legros, Sevres, France

Application January 19, 1955, Serial No. 482,864

Claims priority, application France January 22, 1954

13 Claims. (Cl. 74—10.8)

The present invention relates to a new apparatus for the automatic transmission and reception at a fixed or mobile station, of radio signals on a frequency chosen from among a large number of precisely fixed and regularly spaced frequencies, it being possible to select one of these frequencies at a distance by means of a control box separated from the transmitter, receiver, or transmitter receiver itself.

It is therefore an object of the present invention to provide an apparatus permitting the production of a frequency selected from among a large number of possible frequencies, these frequencies being regularly spaced and equal to the sum of two frequencies, one of which (the principal frequency) is supplied by a harmonic from a standard quartz crystal chosen by a harmonic selector and the other of which (the complementary frequency) is smaller and is determined by a tuned circuit comprising a variable condenser having a certain predetermined number of positions which correspond to the regularly spaced frequencies.

It is another object of the invention to provide an apparatus wherein the resultant frequency is supplied by a stabilized oscillator, this oscillator being equipped with a condenser for linearly varying its frequency, the position of which condenser very nearly determines the operating frequency and which is in turn controlled by these of two other condensers—also linearly variable—one for choosing the desired harmonic of the fundamental frequency of the quartz crystal and the other for regulating the tuning of the circuit determining the complementary frequency.

It is also an object of the invention to provide a remote control apparatus permitting the selection from a distance of the operating frequency, employing only two conductors.

Another object of the invention is to provide a remote control box permitting a choice from among the available frequencies of a certain number of said frequencies called predetermined frequencies (which may be changed at any time), the choice of any one of these predetermined frequencies being made by means of a single control knob.

It is still another object of the invention to provide an apparatus permitting the display in clear of the numerical value of the selected frequency on the control box.

The use of quartz crystals to obtain a particularly stable frequency is well known; the harmonics of the fundamental frequency of the quartz crystal are likewise frequently employed. It is thus possible by means of a single quartz crystal to set up a certain number of stable and regularly spaced frequencies which are multiples $hF_q$ of the fundamental frequency $F_q$ of the quartz crystal, $h$ being an integer called the multiple of the harmonic. Certain known devices permit the selection at will of a certain number of these harmonics, this number running as high as several dozen.

Such a procedure presents a certain number of inconveniences, in particular:

It does not permit the selection of any desired frequencies whatever, except by replacing the quartz crystal.

The available frequencies differ in absolute value by an amount equal to the fundamental frequency of the quartz crystal, which leads, with or without multiplication of the frequency, to transmitting frequencies separated from each other by large intervals becoming broader than the transmitting channels in the usual case in which the width of the channels is limited, thus preventing convenient utilization of an assigned wave band.

The gaps left between the successive harmonics of the quartz crystal may be filled in by adding to the frequencies produced by the crystal a relatively weak frequency obtained for example from a continuously or discontinuously variable auxiliary oscillator, the resultant being obtained by a well known process. The change in the frequency of the oscillator is maintained in absolute value in the frequency finally produced, but is notably weaker under this arrangement than when it is obtained directly by means of an oscillator. In the case in which the auxiliary oscillator is of the discontinuously variable type, one may choose $n$ auxiliary frequencies $F_d$ regularly spaced in the interval between two consecutive harmonics of the crystal.

Having thus the possibility of obtaining a final frequency $F=hF_q+F_d$ the choice of $n$ harmonics of $F_q$ (from the multiple $h_1$ to the multiple $h_n$) combined with that of $m$ auxiliary frequencies $F_d$ permits the choice of a number of frequencies represented by $N=n\times m$. This number is limited only by the limitations inherent in the technical means employed whether electrical or mechanical.

In the following discussion of the theoretical basis of my invention certain condensers are referred to by symbols (such as $C_q$) for the sake of brevity. These precise symbols are not found on the drawing since in practice it has been found convenient to employ two or three physical condensers ganged together to do the work ascribed to a single theoretical element, and the drawing is designed to illustrate a physical embodiment. In general the duties of theoretical condenser $C_q$ are performed by 3, those of $C_d$ by 11 and 9, and those of $C_F$ by 5, **5*a* and 5*b***.

A preferred embodiment of the present invention utilizes a previous invention which formed the subject matter of U.S. Patent No. 2,570,461, filed by applicant June 18, 1947, for "Standard Frequency Generator" (patented October 9, 1951), in which, instead of adding the frequency of a quartz crystal harmonic and the frequency of an oscillator to obtain the useful frequency F, one employs an oscillator set to a frequency as near as possible to F and variable by means of a reactance tube. By means of a frequency conversion one derives the frequency $F-hF_q$ which is applied to a discriminator furnishing a correction voltage which is a function of the difference between the frequency $F-hF_q$ and the frequency $F_d$ of a tuned circuit included in the discriminator. This correction voltage is applied to the control electrode of the reactance tube so as to give to a very close approximation: $F=hF_q+F_d$.

This apparatus has over that previously described the essential advantage of supplying a pure frequency at a relatively high voltage.

It is thus seen that the frequency emitted depends on two controls: the control which selects the harmonic $hF_q$ and the control of the fundamental frequency $F_d$ of the tuned circuit. These two controls comprise, according to the invention, variable condensers so positioned that their rotation causes a linear variation in the frequency of the circuits associated therewith. The circuit which supplies the resulting frequency F may be easily tuned by means of variable condenser $C_F$, of the same type as those already mentioned, the rotation of which is brought about simultaneously with both that of the condenser $C_q$ which selects the harmonic $hF_q$ and with that of the condenser $C_d$ which controls the additive frequency $F_d$. This control means is so arranged that the angle of rotation $A_F$ of the condenser $C_F$ of the circuit designed to operate at the frequency F bears a linear relation to the angles of rotation $A_q$ and $A_d$ of the condensers $C_q$ and $C_d$ respectively, that is to say: $A_F=aA_q+bA_d$, $a$ and $b$ being so chosen as to automatically assure the relation:

$$F=hF_q+F_d$$

between the fundamental frequencies of the different circuits.

According to one feature of the invention the rotation of the condensers $C_q$ and $C_d$ may be brought about by a step by step device capable of being remotely controlled from a control box. This remote control may be accomplished by using, in particular, the apparatus described in the copending U.S. patent application Serial No. 470,719, filed by applicant November 23, 1954, now U.S. Patent No. 2,802,978, for "Distant Control Device for Rotatingly Positioning a Shaft on Precise Preset Positions."

There will now be described, by way of illustrating the possible ways of carrying out the invention, without in any way limiting the scope thereof, one embodiment of the invention and several variations of this embodiment taken as examples and illustrated on the attached drawings in which.

Figure 3A:
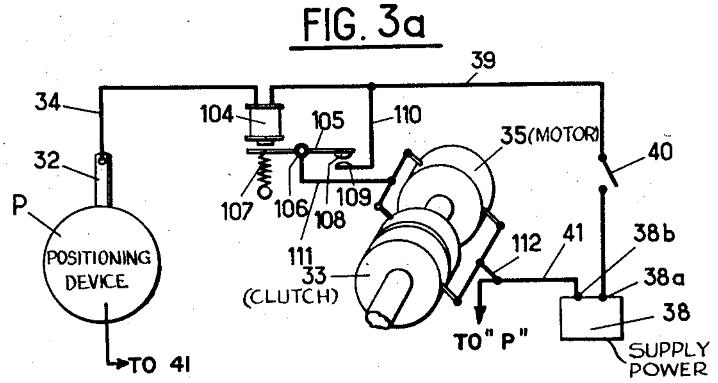
Fig. 3 shows a perspective view of the principal elements of the control box controlling the station shown in Fig. 1.
Figure 3:
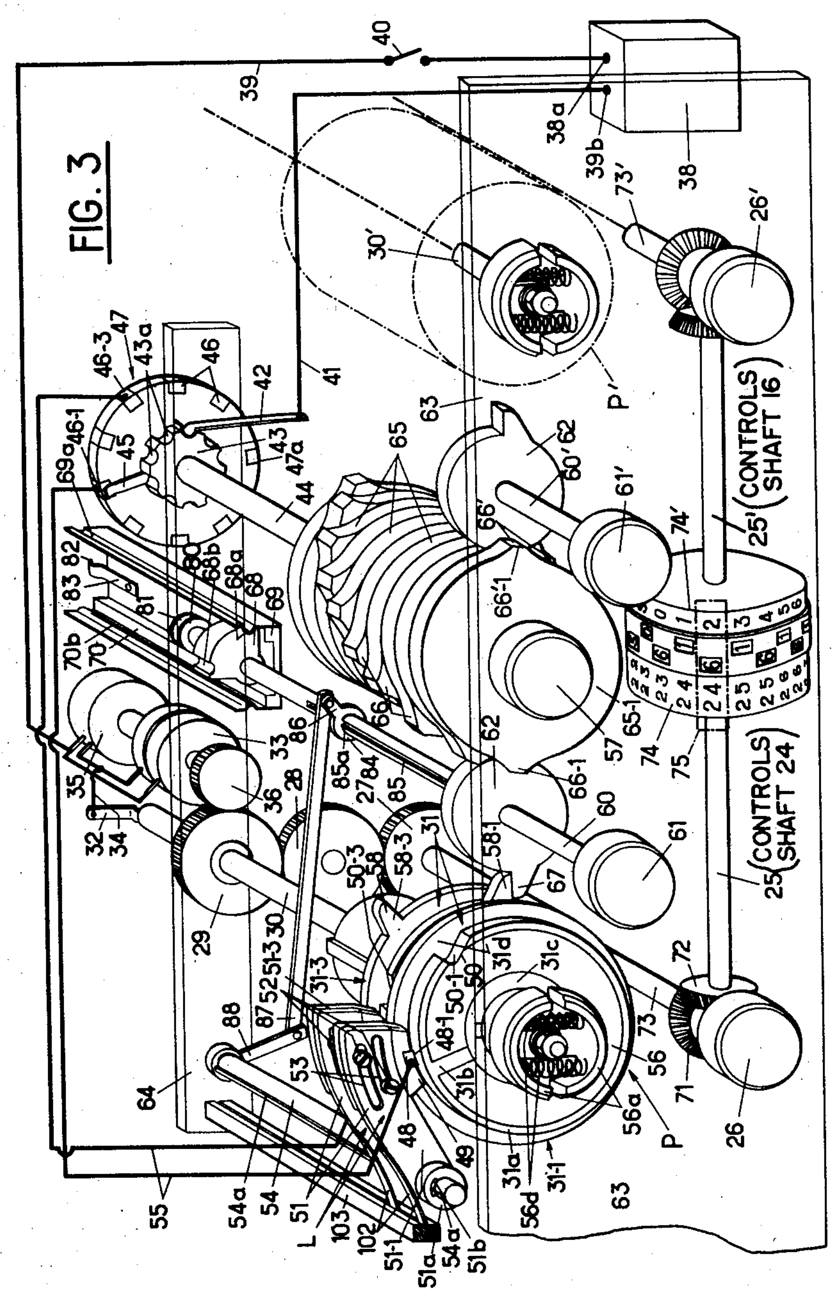
Figure 4:
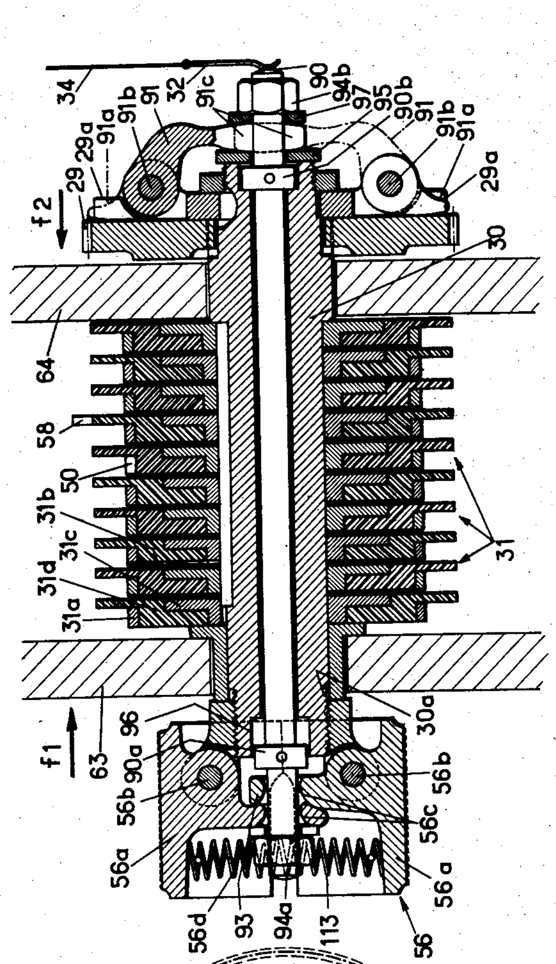
Figure 5:
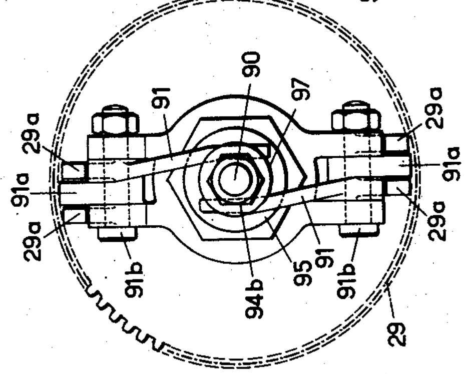
Figure 6:
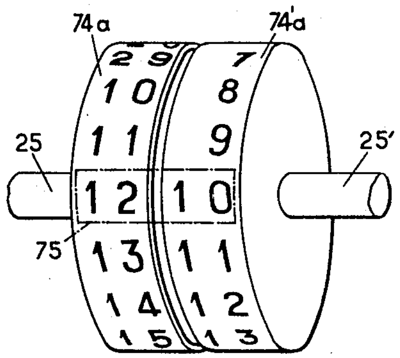
Figure 7:
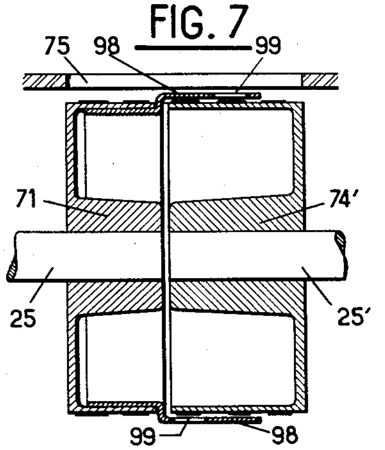
Figure 8:
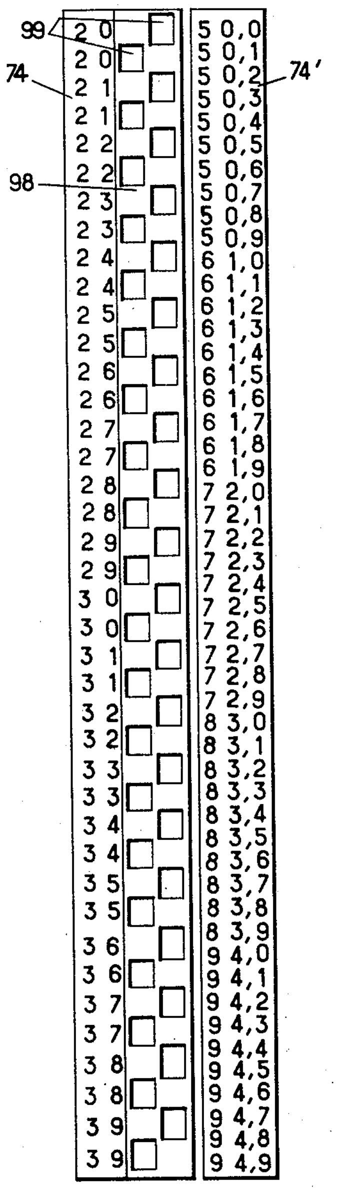

Fig. 3*a* shows a modification of a portion of the electric circuit of Fig. 3;

Fig. 4 is a cross-sectional view of a position control device shown in Fig. 3;

Fig. 5 is an end view of the position control shown in Fig. 4;

Fig. 6 shows in perspective a first embodiment of means for displaying in clear and adapted to cooperate with a control box of the type shown in Fig. 3;

Fig. 7 is an axial cross-section of the drums (of Fig. 3) for displaying in clear the wavelength or the frequency on which the station operates in the case of the preferred embodiment;

Fig. 8 is a development of the two drums of Fig. 7; and

Figure 9:
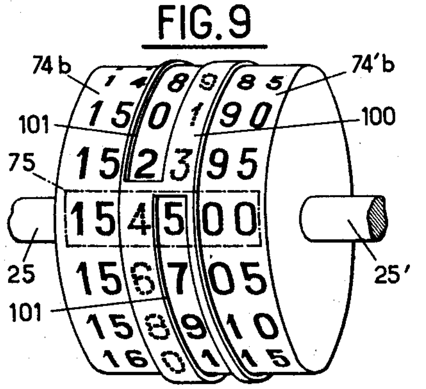

Fig. 9, finally, shows in perspective a third embodiment of the drums for displaying in clear.

Figure 1:
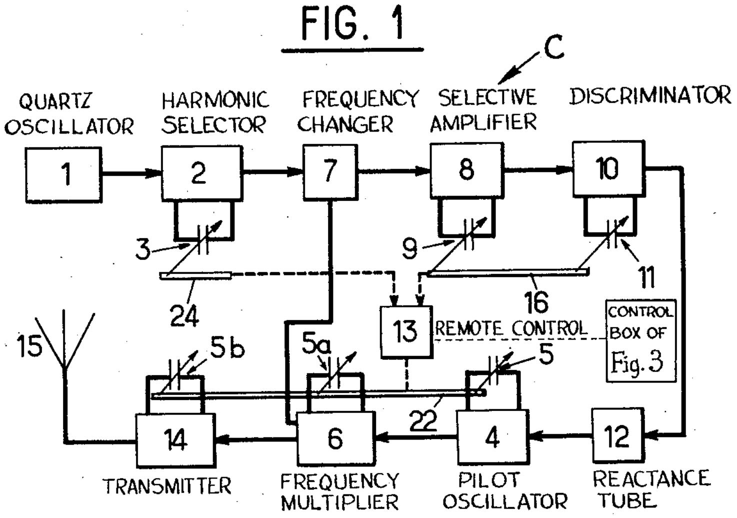
Fig. 1 shows, in the form of block diagrams, the different elements of a device according to the invention in the case of a transmitting station utilizing the particular apparatus described in the aforesaid U.S. Patent No. 2,570,461.

In Fig. 1, there is schematically shown a station C embodying the application of my invention to a pilot frequency standard of the type forming the subject matter of the aforesaid U.S. Patent No. 2,570,461, to which may be added remote control means for setting it at predetermined positions as well as at other positions.

A quartz crystal oscillator of high stability 1 supplies a harmonic selector 2 tuned by a variable condenser 3. A pilot oscillator 4 tuned by a variable condenser 5 feeds a frequency multiplier 6 (tuned by a variable condenser 5*a*), which in its turn, drives a frequency changer 7. This frequency changer 7, driven by the harmonic selector 2 and the frequency multiplier 6, feeds a selective amplifier 8 tuned by a variable condenser 9. A discriminator 10, regulated by a variable condenser 11, is fed by the selective amplifier 8 and controls a reactance tube 12 which acts on the pilot oscillator 4. The transmitter 14 (tuned by a variable condenser 5*b*) receives its carrier frequency from the frequency multiplier 6 and feeds an antenna 15, either directly or after further frequency multiplications (the frequency multipliers being equipped with variable condensers).

Each of the variable condensers 3, 5, 5*a*, 5*b*, 9 and 11 is a linear frequency condenser, that is to say, a condenser the frequency of which varies linearly as a function of the position of the control means. Condensers 9 and 11 are preferably mechanically coupled: for example, their rotors are mounted on the same shaft 16. The variable condensers 5, 5*a*, 5*b* (as well as the linear frequency condensers of the frequency multiplier positioned between the transmitter 14 and the antenna 15) are mounted on a single shaft 22 and controlled by the condenser 3 and the assembly of 9 and 11 by means of control means 13 shown in greater detail on Fig. 2 and described below.

The operation of the station C shown on Fig. 1 is as follows:

The oscillator 1 supplies the group of harmonics of a crystal, the fundamental of which is $F_q$. The harmonic selector 2 transmits the single harmonic $hF_q$ of the crystal, the selection of the integer $h$ being accomplished by rotation of the shaft 24 of the variable condenser 3, this shaft 24 being capable of assuming a certain number of predetermined positions. Since the variable condenser 3 is of the linear type, these different positions are regularly spaced.

The harmonic selector 2 introduces the harmonic $hF_q$ into the frequency changer 7. The pilot oscillator 4, preferably followed by a frequency multiplier 6, introduces into the frequency changer 7 a frequency F which varies linearly as a function of the rotation of the shaft 22 of the variable condenser. From among the frequencies emanating from the frequency changer 7, the selective amplifier 8, tuned by the variable condenser 9, transmits only a very narrow band of frequencies, separating out the frequency $F-hF_q$. The discriminator 10 is adjusted by means of the variable condenser 11, which may assume a predetermined number of positions bringing about the adjustment of the discriminator on a frequency $F_d$.

The discriminator 10 sends a correction voltage to the reactance tube 12, this voltage being a function of the difference $F_d-(F-hF_q)$ and acts on the reactance tube 12 in such a manner that it causes the frequency of the pilot oscillator to slide in a direction diminishing the difference $F_d-(F-hF_q)$.

Under these conditions, the pilot oscillator 4, followed by the multiplier 6, supplies a frequency F very close to the desired frequency $hF_q+F_d$.

The variable condenser 9 which tunes the selective amplifier 8 is also linear in its response; since the frequency on which it operates is the same as that on which the condenser 11 operates, it is possible to fix the rotors of the condensers 9 and 11 on the same shaft 16, thus simultaneously adjusting and tuning the circuits of the amplifier 8 and the discriminator 10. The same situation exists with respect to the condensers 5, 5*a*, 5*b*, and the condensers which are not illustrated and which tune the final frequency multiplier provided before the antenna 15.

The frequency to which the oscillator 4 should be adjusted, followed by the mutiplier 6, is equal to the sum of the frequency set by the condenser 3 and the frequency set by the two coupled condensers 9 and 11. Since the variable condenser 5 varies its frequency linearly, its adjustment is automatically assured by connecting its shaft 22 to the shaft 24 of the condenser 3 and to the shaft 16 of condensers 9 and 11 in such a way that the angle of rotation of the shaft 22 of the variable condenser 5 is a linear function of the angles of rotation of the two shafts 24 and 16.

When frequency multipliers such as 6 are used, their adjustment may be brought about by means of variable condensers such as $5a$ the frequencies of which vary linearly, and which are mechanically connected to the condenser 5.

Figure 2:
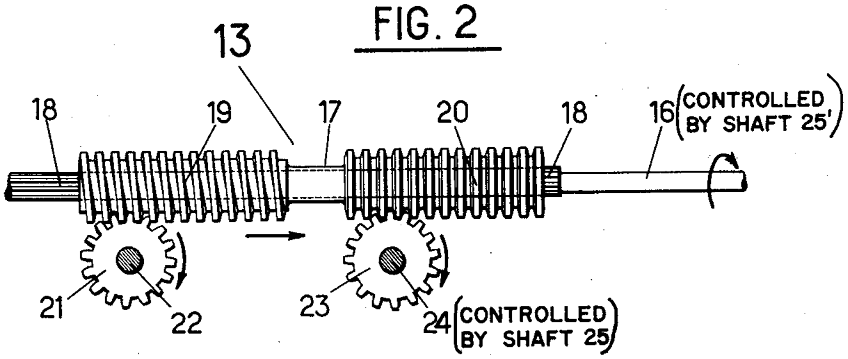
Fig. 2 shows mechanical means for adding angles of rotation which constitute one of the elements of the device shown in Fig. 1.

A suitable arrangement for controlling the rotation of the variable condenser 5 of the pilot oscillator 4 by the rotation of the condenser 3 of the harmonic selector 2 by the rotation of the assembly of condensers 9 and 11 of the selective amplifier 8 and the discriminator 10, is a mechanical apparatus such as illustrated in Fig. 2, which shows in detail the device which appears in Fig. 1 as the block 13.

On the shaft 16 of the variable condenser 11 of the discriminator 10 and of the condenser 9 of the selective multiplier 8 are mounted a worm sleeve 19 and a toothed sleeve 20 having cylindrical teeth connected by a sleeve 17. The assembly of sleeves 17, 20 and 19 is slidable along the shaft 16 which is provided with grooves 18, but rotates with it. A toothed wheel 21 keyed to the shaft 22 engages the worm 19, while a toothed wheel 23 keyed to the shaft 24 engages the sleeve 20. The shaft 22 controls the rotation of the variable condenser 5 of the pilot oscillator 4 and that of the variable condensers $5a$ and $5b$, while the shaft 24 is controlled by the rotation of the variable condenser 3 of the harmonic selector 2.

The apparatus shown in Fig. 2 operates as follows:

The rotation of the shaft 16 directly coupled to the variable condenser 11 of the discriminator 10 and to the condenser 9 of the selective amplifier 8 rotates the sleeves and particularly the sleeve 19, which in turn rotates the shaft 22 (coupled to the variable condenser 5 of the pilot oscillator 4) in an angle proportional to the angle of rotation of the shaft 16 (the ratio between these angles depending on the choice of gears 19—21).

The rotation of the shaft is accomplished, by means of the toothed wheel 23 and the sleeve 20 having cylindrical teeth which act as a rack, the translation along the shaft 16 of the sleeve assembly and particularly that carrying the worm 19 which in turn plays part of a rack. This results in rotation of the toothed wheel 21, and, consequently, that of the shaft 22 at an angle proportional to the angle of rotation of the shaft 24. The ratio of these angles may be fixed at any desired figure by a suitable choice of the dimensions of the toothed wheels 21 and 23.

It will be noted that in the apparatus shown in Fig. 2, the angle of rotation of the shaft 22 is a linear function of the rotation of the shafts 24 and 16, thus affording a suitable connection between the variable condenser 5 of the pilot oscillator 4, both to the variable condenser 3 of the harmonic selector 2 and to the variable condensers 9 and 11 of the selective amplifier 8 and the discriminator 10.

The position of each of the shafts 24 and 16 may, of course, be controlled by knurled knobs provided with index means which move in front of a dial. This is the simplest way of carrying out the invention. But the rotation of each of the shafts 24 and 16 may advantageously be remotely controlled from shafts positioned a certain distance away, for example, in a control box. The remote control means may be of any type, but it may advantageously be constituted by two devices (one for the shaft 16 and the other for the shaft 24) of the type described in the afore-mentioned U.S. patent application filed by applicant November 23, 1954, now U.S. Patent No. 2,802,978, particularly in cases in which one employs a control box which permits each of the shafts 25' and 25 remotely controlling rotation of the shafts 16 and 24 to be brought into the predetermined positions shown on Fig. 3.

This figure shows principally the means for positioning a single shaft, namely the shaft 24, in predetermined positions, the shaft 25 carrying a switch (not shown) keyed thereto which may be of the type shown at the top of the control box illustrated in the aforesaid patent application of November 23, 1954, now U.S. Patent No. 2,802,978, and remotely controlling the shaft 24 by means of the type described in the U.S. patent application which has just been referred to. In the control box of Fig. 3, there is another shaft (the shaft 25') which is controlled exactly like the shaft 25 and which remotely controls by means of like remote control apparauts the shaft 16 of the transmitting and receiving station. It is merely for the sake of simplicity that only the means for positioning the shaft in predetermined positions has been shown in detail on Fig. 3.

The control box of Fig. 3 carries two control knobs, namely, a knob 26 which turns the shaft 25 remotely controlling the shaft 24 of the harmonic selector 2 and a knob 26' which turns the shaft 25' remotely controlling the shaft 16 of the discriminator 10 and the selective amplifier 8.

The remote control means operates on the following principle:

Each of the two knobs 26 and 26' on the control box acts on a switch the rotation of which releases a step by step mechanism which turns the shaft 24 or 16 respectively of the corresponding condenser of the station C to a position corresponding to the value of the capacity chosen by moving the control knob 26 or 26'.

The control box may also carry, either singly or in combination, the following devices:

Means permititng it to operate, on the turning of a single knob 57, on a frequency chosen from among a certain number of predetermined frequencies, these frequencies being designated by a code;

Means permitting modification of the composition of the predetermined frequencies available; and Directly readable means for displaying in clear the numerical value of the frequency on which the station C is operating, whether that frequency be a predetermined frequency set by the knob 57 or another frequency set by the knobs 26 and 26' (this display means which will hereafter be described in greater detail, comprises essentially, on the one hand, a shaft 25 turned by the shaft 73 through a set of pinions 71 and 72 and carrying keyed thereto a display drum 74 which displays through the window 75 in the front panel 63 of the control box numerical indications corresponding to the position of the shaft 25 and consequently the shaft 24, and on the other hand, a shaft 25' turned by the shaft 73' and carrying keyed thereto a display drum 74' which displays through the same window 75 the numerical indications corresponding to the position of the shaft 25' and consequently the shaft 16).

The means for setting the shaft 25 at the predetermined positions will now be described with reference to Fig. 3 (the means for setting the shaft 25' is identical with the setting means for shaft 25).

The knurled knob 26 permits the shaft 25 to be turned manually, particularly in the case in which it is desired to operate on a frequency which has not been predetermined. The shaft 25 is driven through two sets of gears, 27, 28, 29 and 71, 72, having an overall 1 to 1 ratio, by a shaft 30 on which are mounted $p$ discs 31, only two of which have been illustrated on Fig. 3, in order not to overcrowd this figure. (The simplified position control P carried by the shaft 30 will be described in greater detail hereafter by reference to Figs. 4 and 5.) The shaft 30 is a conductor of electricity, but it is insulated from the rest of the apparatus.

At the end of the positioning means P is a brush 32 electrically connecting the shaft 30 to a magnetic clutch 33 and an electric motor 35, connected in parallel, through a conductor 34. The magnetic clutch 33 engages or disengages the electric motor 35 with a toothed wheel 36 which engages the toothed wheel 29. When there is not current flowing through hte conductor 34, the clutch 33 is disengaged. The motor 35 and the clutch 33 mounted in parallel therewith are fed from the terminal 38a of a power supply 38 through a conductor 39. A break switch 40 serves to cut off the current. The other terminal 38*b* of the power supply 38 is connected by a conductor 41 to the brush 42 which cooperates with a conducting drum 43 having engaging notches 43*a*. The movable arm 45 which turns with the drum 43 keyed to the shaft 44 over contacts 46 mounted on the insulating portion 47*a* of the contact ring 47. The shaft 44 which carries the contact ring 47 is controlled by a knurled knob 57.

On the other side, *p* metallic contacts 48 are mounted on *p* insulating elements 49. Each contact 48 slides on each of the discs 31. Each of the discs 31 carries a conducting ring 31*a* electrically connected to the shaft 30 by a strip 31*b*. In the conducting ring 31*a* of each disc 31, a notch 50 has been cut in order that the electrical connection between the shaft 30 and the corresponding contact 48 may be cut when this notch is turned to a position opposite the contact 48. Each insulating element 49 is fixed to another supporting element 51 by means of two screws 52 extending through two holes 53 cut into the element 51. The *p* elements 51 are mouned by means of rings 51*a* provided with an opening 51*b* on a shaft 54 carrying a tongue 54*a*. The assembly of elements 49, 51 and 51*a* and the contact 48 constitute a pawl L and there are as many pawls L as discs 31. Each pawl L is urged, by an electrically conductive blade 102 set in a rod 103 fixed to panels 63 and 64, against the corresponding ring 31*a*. Each of the pawls L may be lifted individually thanks to the opening 51*b* provided in the ring 51*a* of each supporting element 51. In order to simplify the drawing only two pawls L have been shown on Fig. 3. The *p* contacts 48 are connected to *p* terminals 46 by *p* wires 55.

In order to increase the accuracy and safety of the operation of the electrical controlling circuit and to prevent sparks from jumping between the ring 31*a* and the contact 48 which are live, it is advisable to feed the parallel clutch-motor assembly 33—35 through a relay as shown on Fig. 3*a*, which shows a modification of one part of the electric circuit of Fig. 3, rather than directly as in Fig. 3 itself.

In the embodiment shown in Fig. 3*a*, a coil of the relay 104 is positioned between the wire 34 connected to the terminal 38*a* of the power supply 38 and the wire attached to the brush 32. The coil 104 acts on a movable armature 105 pivotally mounted at 106 and biased by a spring 107. The armature 105 carries a contact 108 which cooperates with a contact 109 connected by a wire 110 to the wire 39. The parallel assembly 33—35 is connected by a wire 111 to the armature 105 and by a wire 112 to the wire 41.

The operation of the assembly shown in Fig. 3 which is about to be described and which constitutes only a part of that figure is as follows:

When the switch 40 is closed and the knob 57 turned to bring the arm 45 into contact with another contact 46 (for example the contact 46 bearing reference number 46–3) than that on which it was originally positioned (contact bearing reference number 46–1) and which corresponds to a stable position of equilibrium in the system, an electrical connection is made between the supply 38 and one of the contacts 46 (the contact 46–3) and the circuit is closed through the contact 48–3 (not visible on the drawing), corresponding to the contact 46–3 against which the arm 45 presses, and the conducting portions 31*a* and 31*b* of the corresponding disc 31–3. This brings about the excitation of the clutch 33 and the rotation of the motor 35 which drives the pinion 36 to which it is clutched. The pinion 36 turns the toothed wheel 29 thus driving the discs 31 mounted on the shaft 30 until the notch 50–3 of the discs 31–3 comes opposite the contact 48–3, which breaks the electric circuit and consequently releases the clutch 33 and stops the motor 35. The shaft 30 immediately stops rotating. The shaft 25 has turned during this time so that the shaft 30 has caused the gear train 27, 28, 29, 71 and 72 to turn through an angle of rotation equal to that of the shaft 30.

In the case of the modification shown in Fig. 3*a*, the operation of the circuit is changed in the following way:

When the current (coming from the supply source 38) passes through the coil 104, the latter attracts the left hand end of the armature 105 against the resistance of a spring 107, thus bringing thereto the contacts 108 and 109, which closes the circuit constituted by the wire 39, the wire 110, the contacts 109 and 108, the armature 105, the wire 111, the assembly 33—35, the wire 112 and the wire 41: the clutch 33 and the motor 35 are thus fed by a circuit which is independent of that which includes the friction contacts of the positioning means P. The current passing across the friction contacts of the control means, and in particular across the contacts between the pawl L and the disc 31, is very weak. When the current passing through the coil 104 is interrupted (as by opening the switch 40 or by breaking the circuit between all the contacts 48 and all the discs 31) the return spring 107 opens the contacts 108 and 109, as shown on Fig. 3*a*.

The rotation of the knob 57 to a specified angle has turned the shafts 30 and 25 to certain predetermined angular positions which depend solely on the angular position of the notch 50–3 with respect to the shaft 30 and the position of the contact 48–3 in its pawl L. A smaller adjustment of each contact 48 may be brought about by slightly raising the pawl L which carries it, unscrewing the screws 52, and slightly changing the position of the insulating element 49 with respect to the element 51 and then retightening the screws 52, the slots 53 serving to permit this slight relative displacement of the elements 49 and 51.

In order to permit a greater change in the relationship, it is necessary to change the position of the notches 50 with respect to the shaft 30. For this purpose a knob 56 has been provided, which is screwed on the shaft 30 and serves to lock the discs 31 on that shaft, or to unlock them, the method of bringing about this locking will hereinafter be described.

The way in which the angular position of the discs 31 with respect to shaft 30 may be regulated will now be described.

On each disc 31 is a protuberance 58. A sliding assembly composed of a shaft 60, a control knob 61 and a cam 62 is slidably mounted between the front and back plates 63 and 64 of the control box, and carries at the end away from the knob 61 a quarter section of a cylinder having two longitudinal slots 68*a* and 68*b* and a cylindrical element 80 having a groove 81 adapted to cooperate with the bent up end of the leaf spring 83. One of the flat faces of the quarter-sectional member 68 is slidable along either the runway 69 or the runway 70. The upright sides of these runways each carry a longitudinal tongue 69*a* or 70*b* which is adapted to cooperate with the groove 68*a* or 68*b*.

The shaft 44 carries *p* discs 65 each provided with two bosses 66 and 66′ diametrically opposite to each other. The discs 65 are permanently keyed to the shaft 44 in such a manner that their bosses 66 (and consequently 66′) are angularly spaced from each other by an angle equal to $$\frac{180°}{p}$$

while the bosses 66′ at the right describe a helix on a diametrically opposite half-circle as shown on the drawing.

When the knob 61 is pulled forward as far as it will go, it can move forward until the cam 62 encounters a boss 66 which prevents it from coming forward any further. The position of the different bosses 66 on the discs 65 and of the contacts 46 on the switch 43 may be, for example, such that the cam 62 will be stopped by the boss 66 of the disc 65 corresponding to the contact 46 on which the movable arm 45 of the switch 47 is positioned. The cam 62 carries a protuberance 67 adapted to cooperate with the protuberances 58 carried by the discs 31, the protuberance 67 serving as a stop for the cog 58 of one of the discs 31 when the knob 61 is turned as far clockwise as possible.

The shaft 60 may be turned 90°, its turning being stopped when the sides of the element 68 meet those of the runway 69 or the runway 70 engaging 68*a*—69*a* or 68*b*—70*b*. Axial displacement of the shaft 60 toward the front is stopped as hereinafter indicated when the cam 62 butts against a boss 66 and toward the back by seating of the bent up end of the leaf spring 83 in the groove 81.

In a modification only *p*–2 discs 65 need be provided, the two end discs being replaced by the panels 63 and 64 which support the several shafts.

The setting of the predetermined positions is as follows:

The break switch 40 is opened to avoid the transmission of any electric current during this adjustment.

When the mechanism shown in Fig. 3 is in operative position, the knob 61 is pushed as far back as possible (bringing the bent up part 82 of the leaf spring 83 into engagement with the groove 81), the knob 61 being turned as far as possible counterclockwise (the tongue 70*b* cooperating with the groove 68*b*). To bring about a change in a predetermined setting the knob 57 is brought into the setting it is desired to change (a pointer carried by the knob 57 moves in front of a dial not illustrated on the panel 63, the dial carrying reference numbers corresponding to the predetermined positions). The knob 61 is then drawn forward until cam 62 meets the boss 66–1 on the disc 65–1 corresponding to a numerical indication (number 1 has been chosen by way of example) the setting of which it is desired to change.

The knob 61 is then turned a quarter turn in a clockwise direction until the side of the element 68 butts against the runway 69 engaging 68*a* and 69*a* (means not illustrated may be provided urging the cam 62 against the boss 66–1 which serves as a stop). The cog 67 is then in the position shown in Fig. 3 (extending horizontally to the left).

A ring 84 is slidably mounted on the shaft 60, but turns with it (by reason of a groove 85 in the shaft which cooperates with a tooth 85*a* on the ring 84) and carries a shaft lever 86 which controls the rotation of the shaft 54 through a connecting rod 87 and a lever 88. Due to this arrangement, a quarter turn of the knob 61 in a clockwise direction raises all the pawls L keyed on the shaft 54 against the pressure exerted by the leaf springs 102 mounted in the rod 103 fixed to the panels 63 and 64.

The slight raising of the pawls L (into the position shown on Fig. 3) has had the effect of eliminating all friction between the pawls L and the discs 31 so that they may be turned freely when the shaft 30 is rotated, as will now be explained.

The knob 26 is then turned in a clockwise direction until it butts, that is to say, until the cog 58–1 butts against the cog 67. The knob 56 is then unscrewed, thus loosening the discs 31 which nevertheless continue to be frictionally turned by the shaft 30 (except for the disc 31–1 which is held against its stop). This loosening will be explained more fully in connection with the detailed description of the simplified positioning means P carried by the shaft 30.

Turning of the knob 26 is continued, always in the same direction, until the desired index number on the drum 74 appears in the display window 75. This turns the shaft 30 and consequently all the discs 31, with the exception of disc 31–1 carrying the cog 58–1 which is stopped by the cog 67. The knob 56 is again screwed up to hold all the discs 31 tight on the shaft 30. The disc 31–1, rotation of which was prevented by the butting of its cog 58–1 against the cog 67 has been thus shifted in relation to the assembly of other discs 31 and occupies the desired position, that corresponding to the value indicated on the drum 74 in the window. And as a result the cogs 58 and the notches 50 of the discs 31 are so positioned that, when the cog 58 of any disc 31 butts against the cog 67 extending to the left in a horizontal position, the notch 50 of the same disc is opposite the corresponding contact.

Once this adjustment has been completed, the knob 61 is turned a quarter-turn counterclockwise and pushed back as far as it will go until the bent up part 82 of the spring 33 engages the groove 81 and the device is ready to operate again, after the switch 40 is closed.

As a general rule, both the position of the disc 31–1 on the shaft 30 and that of the corresponding disc (not shown) on the shaft 30′ of the positioning means P′ should be adjusted. This adjustment is accomplished in the same manner for the disc mounted on the shaft 30 which acts on the knob 61′, the cam 62′ carried by the shaft 60 coming into engagement with the right hand boss 66′–1 carried by the disc 65–1. Of course, the directions of rotation are reversed, the knobs 61′ and 26′ are turned in a counterclockwise direction.

When the positions of two discs carried by the shafts 30 and 30′ have been adjusted with respect to one of the predetermined positions (the knob 57 occupying a specified angular position with respect to a ratchet 43*a*—42), the same method may be used for the setting of one or more predetermined positions.

It has been seen that the control box of Fig. 3 has two simplified positioning devices P and P′ (carried by shafts 30 and 30′) the precision of which need not be very great, since the remote control means described in the hereinbefore mentioned application of November 23, 1954, ensures the precise positioning of the shaft by means provided near said shaft.

On Figures 4 and 5 such positioning means are shown in detail, for example, the positioning device P carried by the shaft 30 and comprising *p* discs 31. It is of course possible to employ positioning means of known types to carry out the invention.

The positioning device P, carried by the shaft 30, is, as will be seen below, operatively connected to the display drum 74 through the gears 27, 28, 29, 71 and 72 having an overall gear ratio of 1 to 1, a complete turn of the positioning means corresponding to a complete turn of the drum 74.

The shaft 30 of the positioning means P is hollow to admit a rod 90 and carries *p* two-part discs each comprising a conducting ring 31*c* keyed on the shaft 30 and an insulating rim 31*d* which is free to turn on the ring 31*c* in the absence of any axial clamping. In order to clamp and tighten the group of *p* discs 31 a special knob 56 is provided which screws onto the shaft 30.

The knob 56 comprises two levers 56*a* which are moved automatically by the hand when it tightens or loosens the knob 56 screwed on the threaded end 30*a* of the shaft 30.

When the two members 56*a* are brought toward each other by pivoting them about the pins 56*b*, the rod 90 is moved in the direction of the arrow *f*1 sliding through the bore 90*c* in the shaft 30 and the bore 56*c* in the member 56*a*, the relative axial displacement of the rod 90 and the bore 56*c* being limited by the head 90*a* which is slidable in a bore 96 in the shaft 30 on the rod 90 and by the nut 94*a* which encounters a washer 113.

The displacement of the shaft 90 in the direction of the arrow *f*1 moves its other head 90*b* in the same direction and consequently the washers 95 and 97 held by the nut 94*b*. As a result, the ends 91*c* (positioned between the washers 95 and 97) of the levers 91 are displaced in the direction of the arrow *f*1, the levers being adapted to pivot about pins 91*b*. The free ends 91*a* of the levers 91 then move in the direction of the arrow *f*2 and press against the toothed wheel 29 freely mounted on the shaft 30, locking the wheel 29 against the panel 64 (Figs. 3 and 4).

This prevents any angular displacement of the positioning means P during the moving of the knob 56.

This arrangement has been provided in order to reduce the time required for handling the knob 56 by reducing to a single movement two operations, namely the maintenance in its angular position of the shaft 30 and the tightening or loosening of the knob 56, that is to say, the tightening or loosening of the group of *p* discs 31 accomplished by screwing or unscrewing the knob 56.

Each insulating rim 31*d*, as pointed out above in connection with Fig. 3, carries, on the one hand, a cog 58 serving to fix its angular reference position in cooperation with the cog 67 on the cam 62 carried by the shaft 60, and on the other hand, a conducting ring 31*a* which is force-fitted thereon and into which a notch 50 has been cut. Each disc 31 is also provided with a contact member 31*b* seated therein to bring about electrical contact between the collar 31*c* and the ring 31*a*.

The conducting elements 31*a*, 31*b* and 31*c* provide an electrical connection between the contacts 48 and the shaft 90, the end 90*a* of which frictionally engages the brush 32.

The two parts 56*a* of the knob 56 are held apart, when the knob 56 is not being manually gripped, by two springs 56*d* which, through the rod 90 urge the free ends 91*a* of the levers 91 in the direction of the arrow *f*1, thus permitting the free rotation of the positioning means P in the absence of presetting movements.

By referring more particularly to Fig. 5, it may be seen that the toothed wheel 29 carries two pairs of flanges 29*a* for the accommodation of the free ends 91*a* of the levers 91, through which the shaft 30, and consequently the positioning means are driven when the clutch 33 and the motor 35 are in service.

The assembly constituting the positioning means P is mounted on a insulating supporting frame, for example the plates 63 and 64. In fact, as indicated above, the positioning assembly must be insulated from the rest of the apparatus.

The other positioning means P′ of the same type as the positioning means P, is carried by the shaft 30′. This second positioning means also comprises *p* discs and rotates with the shaft 25′ one complete turn of the shaft 30′ corresponding to a complete turn of the shaft 25′.

The angular position of the shafts 25 and 25′ respectively remotely controlling the shafts 24 and 16 of Figures 1 and 2, is indicated by two drums 74 and 74′ which move before a window 75 provided in the panel in front of the control box.

On Figures 3, 7 and 8 is shown a preferred embodiment of the display drums 74 and 74′ but other embodiments may be provided, as may be desired, for example, that shown on Figure 6 which is the simplest, or that shown on Figure 9.

The display means always comprises two co-axial drums, one seated against the other, namely a drum 74 (or 74*a* or 74*b*) and a drum 74′ (or 74′*a* or 74′*b*). Each of the drums may carry a different number of indicia, for example, the drum 74 may carry *n* indicia, if *n* distinct angular positions are provided for the control shaft 24 of the harmonic selector and consequently of the shaft 25, whereas the drum 74′ may carry *m* indicia if *m* distinct angular positions are provided for the control shaft 16 of the discriminator and consequently of the shaft 25.

In the simplest embodiment illustrated on Figure 6, all the numbers marked on each drum 74*a* and 74′*a* are always used, when it is desired, for example, to cover the range of frequencies from 1000 to 3000 kilocycles, making use of a quartz crystal the fundamental $F_q$ of which is 100 kilocycles and from which the frequencies 8 to 27 are picked up, to which an auxiliary frequency varying between 200 and 300 kilocycles is added, we will have:

$$F=hF_q+F_d$$

Let there be, for example: $10\times F_q+210$ kilocycles, that is, 1210 kilocycles.

The drum 74*a* will read 12, while the drum 74′*a* will read 10, the reading taking place at a window 75 through which the necessary numbers are visible. This arrangement leads, for reading in kilocycles, to the choice of $n=20$ for the harmonics of the quartz crystal and $m=100$ for the positions of the discriminator. 2,000 regularly spaced points are thus obtained, distributed throughout the range are directly readable between 1000 and 3000 kilocycles. This embodiment of the drums shown on Figure 6 is suitable whenever *m* is equal to a positive whole power of 10, for example 10 or 100.

On the contrary it is not possible for certain reasons to have $m=10$ or 100 recourse must be had to drums having means for hiding certain of the marked numbers. For example, it may be desired to cover the range of frequencies from 200 to 400 megacycles at 2000 points spaced 100 kilocycles apart, whilst attempting to provide substantially equal precision for the angular positioning of the two shafts 16 and 24 and, consequently, 25′ and 25. One may take, for example, $n=40$ and $m=50$; this embodiment is illustrated on Figures 3, 7 and 8.

The interval between two consecutive harmonies is $$\frac{400-200}{40}=5 \text{ megacycles}$$

while the interval between two consecutive positions of the discriminator is $$\frac{5}{50}=0.1 \text{ megacycle}$$

Since each harmonic group covers only 5 megacycles, direct reading is impossible and recourse must be had to the artifice mentioned above, which is, of course, equally suitable for other ranges of frequencies. A hollow cover cylinder 98 is carried by the drum 74 and rotates therewith, this cylinder 98 having a series of openings 99 (alternately disposed in two rows, which alternately hide the first or the second number on the drum 74′). A development of each of the two drums is shown on Figure 8, 74 (with its cylinder 98) and 74′ spaced one from the other. The left hand drum 74 carries indicia from 20 to 39 repeated twice and the set of windows 99, already described, while the right hand drum 74′ carries in its second and third columns, the indicia 0.0 to 4.9 and on its first column, a number equal to the number of the second column plus five. When the two drums are positioned as shown in Figures 3 and 7, the advance by one notch of the right hand drum 74′ increases by ten the megacycle indication visible through the window 75, while the displacement by one notch of the left hand drum 74 increases by 5 megacycles the indication visible through the window 75, by modification either of the last number marked on the drum 74 and a concomitant modification of the number marked on the drum 74′ which appear in the opening 99 opposite the window 75, or by simple modification of the number on the drum 74′ which appears in the other opening 99 opposite the window 75.

In the modification shown on Figure 9, a cover cylinder 100 is provided having cut-out zones 101.

Let us cover, for example, the range of 100 to 160 megacycles with 1,200 points spaced .05 megacycle apart with $n=30$ and $m=40$. The interval between two consecutive harmoncs is:

$$\frac{160-100}{30}=2 \text{ megacycles}$$

and between two consecutive positions of the discriminator is:

$$\frac{2}{40}=0.5 \text{ megacycle}$$

A series of readings on two simple drums not provided with covering cylinders would be, for example, for a succession of rotations of the two drums of:

150 for $hF_q$ and 0.90 for $F_d$
152 for $hF_q$ and 0.95 for $F_d$
154 for $hF_q$ and 1.00 for $F_d$
156 for $hF_q$ and 1.05 for $F_d$
158 for $hF_q$ and 1.10 for $F_d$ and a total which must be calculated of:

150.90
152.95
155.00
157.05
159.10

A difficulty in calculation and hence in the modification of the device to permit reading through the window 75 results from the passage from the two digit numbers to the three digit numbers on the right hand drum.

For this purpose a hollow cover cylinder may be provided which turns with the drum **74'*b* and comprises cut-out zones 101 as shown on Figure 9. It is readily apparent from this figure that for those numbers of the drum 74'*b* which comprise only two digits, the supplemental column (last column to the right) of the drum 74*b* is covered (the one which shows above the window 75 of Figure 9); on the contrary for numbers on the drum 74'*b* comprising three digits, it is the next to the last column to the right of the drum 74*b* which is covered while the supplemental column is visible (the one which is seen at the height of and below the window 75** in Figure 9).

Of course, in more complex cases, the two drums carried by the shafts 25, 25' may simply be marked with coded indicia (for example, numbers on one and letters on the other) but it is always preferably to carry the indicia in the clear, through recourse to one of the embodiments of Figures 6 to 9.

It will of course be understood that the embodiments of my invention described and illustrated herein may be modified, improved or added to, and that certain elements may be replaced with equivalent elements without thereby departing from the spirit of my invention.

What I desire to claim and secure by Letters Patent is as follows:

1. Means adapted to be remotely controlled for adjusting the position of a group of three variable condensers mounted on first, second and third shafts which condensers control the operating frequency of electrical apparatus which is adjustable to operate on any of a plurality of frequencies, said means comprising a sleeve keyed to said first shaft and slidable axially therealong and comprising a cylindrically toothed section and a worm section, a pinion fixed to said second shaft and engaging said cylindrically toothed section, and another pinion fixed to said third shaft and engaging said worm section, whereby the angular position of one of said shafts may be determined by turning the other two.

2. A remote control box for regulating the operating frequency of electrical apparatus which is adjustable to operate on a plurality of frequencies carrying first and second positioning shafts, individual positioning knobs for said shafts, gear means between said knobs and shafts through which said shafts may be manually turned by means of said knobs, a third frequency selecting shaft and electrical means controlled by said frequency selecting shaft adapted to drive said positioning shafts.

3. A remote control box as claimed in claim 2 in which the frequency selecting shaft carries a selector switch provided with a specific number of contacts, each of the positioning shafts carries a corresponding number of insulating discs, each carrying a conducting ring electrically connected to its shaft, a pivotally mounted pawl adjacent each disc carrying an electrical contact adapted to cooperate with its conducting ring and electrically connected to one of the contacts on the selector switch, each positioning shaft being electrically connected to one terminal of a power supply, the second terminal of which is connected to said selector switch, forming an electric circuit in which an electrically actuated motor-clutch is electrically positioned between said selector switch and each positioning shaft and geared to said positioning shaft to drive it when electrically excited.

4. A control box as claimed in claim 3 in which each conducting ring is electrically broken at one point and failure of the pawl in electrical contact with the selector switch to contact the corresponding conducting ring interrupts said circuit.

5. A control box as claimed in claim 4 in which all of said pawls are mounted on a single axis and adapted to be withdrawn as a unit from contact with said conducting rings.

6. A control box as claimed in claim 2 in which each positioning shaft is hollow and carries a rod extending slidably therethrough, a plurality of insulating discs mounted on said shaft, lever actuated means at one end of said rod for axially displacing it with respect to said shaft and clutch means at the other end of said rod responsive to axial displacement thereof for clutching said discs and shaft against rotary motion.

7. A remote control box as claimed in claim 2 in which each positioning shaft carries an identical number of insulating discs together with means for releasing them for angular movement about said shaft, and the frequency selecting shaft carries a corresponding number of discs each carrying a pair of diametrically opposed bosses, the bosses each being angularly spaced from those on the adjacent discs by $$\frac{180}{p} \text{ degrees}$$

when $p$=the number of discs on each shaft, two control slides each comprising a rod, a knob on said rod, and a cam on said rod carrying a protuberance adapted to engage a positioning shaft boss, the axial displacement of said slide rod being limited in one direction by its butting against a boss on a frequency selecting shaft disc, and in the other direction against a slide box the sides of which limit the angular movement of said shaft by butting against a quarter sector fixed thereto.

8. A device as claimed in claim 7 in which each disc on each positioning shaft carries a radially extending boss adapted to engage the protuberance on the adjacent slide rod cam, to prevent angular movement of said disc with respect to its shaft when discs are released by said releasing means.

9. A device as claimed in claim 8 in which each positioning shaft disc carries a conducting ring electrically connected to its shaft, and an adjacent pawl supporting rod carries a pawl corresponding to each positioning shaft disc, each pawl having an electrical contact adapted to engage the corresponding conducting ring, said slide rod and pawl supporting rod being so mechanically connected that the rotation of each slide rod in the direction which engages its cam's protuberance with a positioning disc boss also rotates the pawl supporting rod correspondingly.

10. A device as claimed in claim 2 in which said first and second positioning shafts drive parallel indicating drums bearing indicia readable as a single datum through a single window.

11. A device as claimed in claim 10 in which one of said drums is provided with a rotating cover having windows permitting the indicia in two parallel columns on said drum to be read alternately.

12. Means as claimed in claim 1 comprising also a remote control box provided with first and second remote control shafts controlling the rotation of said first and second condenser carrying shafts respectively.

13. Apparatus as claimed in claim 12 in which said first remote control shaft drives through a gear train the shaft of a first positioning means and the second remote control shaft drives through a gear train the shaft of a second positioning means and the control box carries a third shaft adapted to set a group of predetermined frequencies, the rotation of which third shaft electrically drives said positioning shafts.

References Cited in the file of this patent

UNITED STATES PATENTS

| | | |
|---|---|---|
| 92,678 | Weusthoff | July 13, 1869 |
| 1,387,636 | Alden | Aug. 16, 1921 |
| 2,273,602 | Traut | Feb. 17, 1942 |
| 2,378,941 | May | June 26, 1945 |
| 2,436,235 | Sunstein | Feb. 17, 1948 |
| 2,495,917 | Miner | Jan. 31, 1950 |
| 2,521,070 | Lindner et al. | Sept. 5, 1950 |
| 2,567,585 | Wagenknecht et al. | Sept. 11, 1951 |
| 2,568,412 | Robinson | Sept. 18, 1951 |
| 2,581,594 | Mac Sorley | Jan. 8, 1952 |
| 2,595,608 | Robinson et al. | May 6, 1952 |

FOREIGN PATENTS

| | | |
|---|---|---|
| 857,020 | France | Aug. 22, 1940 |